April 21, 1970  M. A. FLAVIN ET AL  3,507,682
PROCESS AND APPARATUS FOR COATING THIN FILM SUBSTRATES
Filed June 19, 1967  2 Sheets-Sheet 1
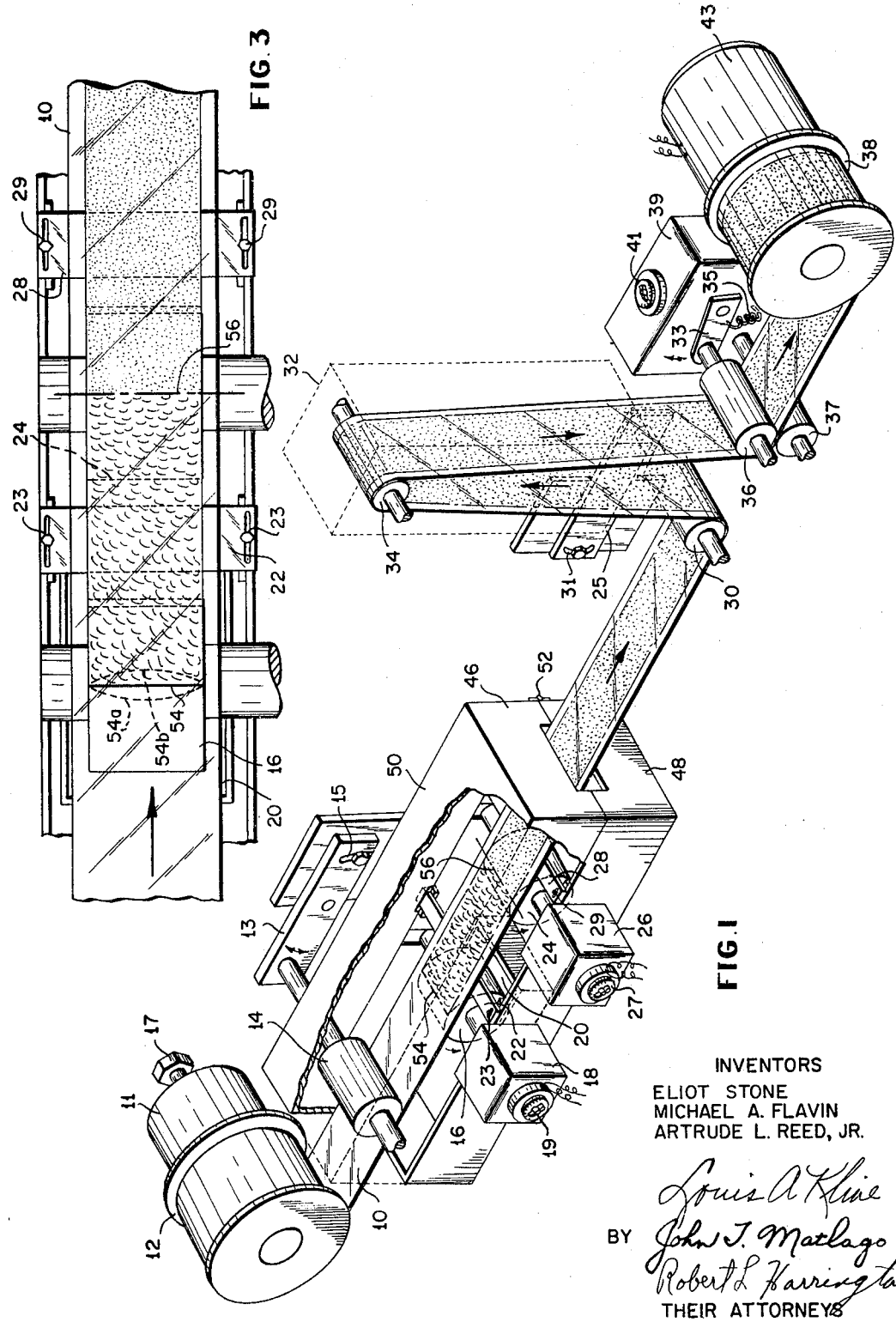
INVENTORS
ELIOT STONE
MICHAEL A. FLAVIN
ARTRUDE L. REED, JR.
BY Louis A Kline
John T. Matlago
Robert L. Harrington
THEIR ATTORNEYS April 21, 1970  M. A. FLAVIN ET AL  3,507,682
PROCESS AND APPARATUS FOR COATING THIN FILM SUBSTRATES
Filed June 19, 1967  2 Sheets-Sheet 2
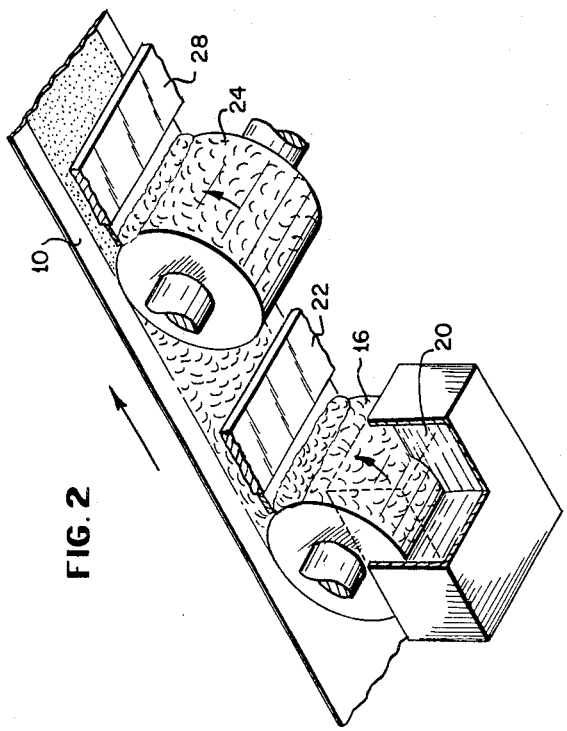
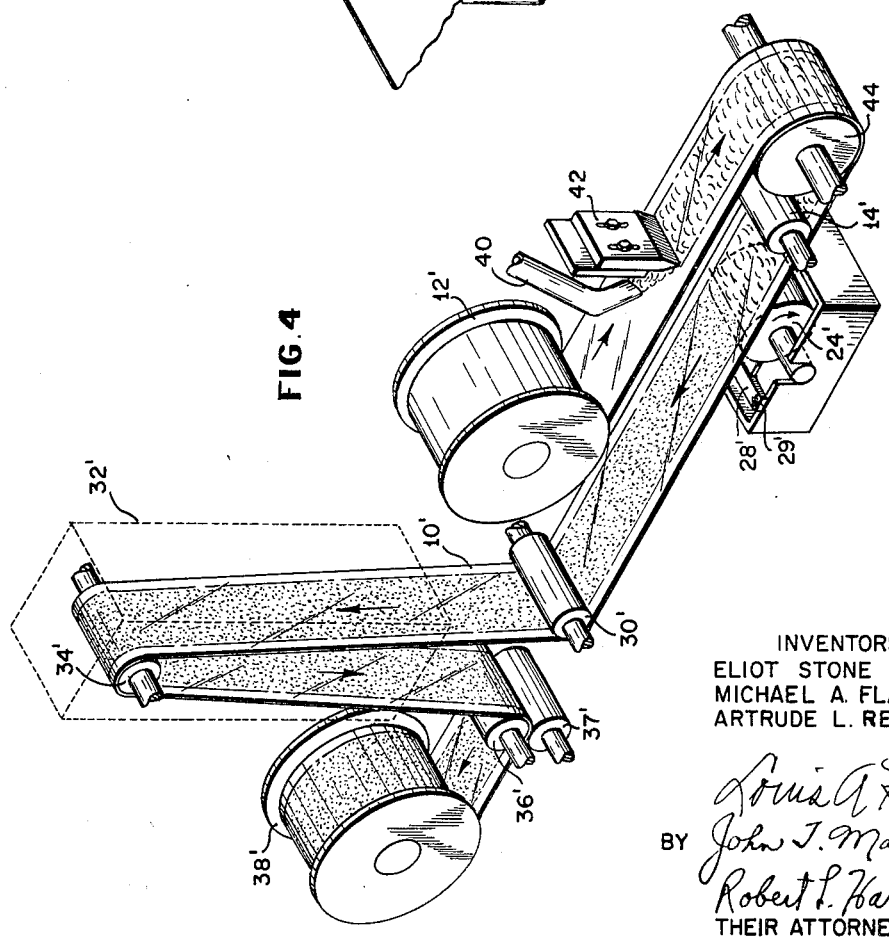
INVENTORS
ELIOT STONE
MICHAEL A. FLAVIN
ARTRUDE L. REED, JR.
BY Louis A. Kline
John T. Maclago
Robert L. Harrington
THEIR ATTORNEYS United States Patent Office 3,507,682
Patented Apr. 21, 1970

3,507,682
PROCESS AND APPARATUS FOR COATING
THIN FILM SUBSTRATES
Michael A. Flavin, Los Angeles, Artrude L. Reed, Jr., Palos Verdes Peninsula, and Eliot Stone, Los Angeles, Calif., assignors to The National Cash Register Company, Dayton, Ohio, a corporation of Maryland
Filed June 19, 1967, Ser. No. 646,955
Int. Cl. B44d 1/48; B05c 1/08, 11/02
U.S. Cl. 117—63
5 Claims

ABSTRACT OF THE DISCLOSURE

A process and apparatus wherein a solution is applied to one side of a thin film substrate. The film substrate with coated side down is passed over a smoothing roller. The smoothing roller rotates to provide reverse tangential contact with the film substrate while the coating thereon is wet. The roller rotates in free air and a wiper blade is located with respect to the roller surface to remove all but a very thin, e.g., 1 mil, coating material off the surface of the roller. The speed of rotation of the roller, the viscosity of the liquid, the speed of the film substrate, and the extent of tangential contact of the film to the roller are coordinated to provide a desired thin, smooth, uniform coating on the film substrate.

BACKGROUND OF THE INVENTION

This invention relates to a process for coating thin film substrates.

There has developed over recent years an increasing need for various types of very thin film substrates having one side thereof coated with a very thin coating material, e.g., a .001 inch thick Mylar film coated with a .5–10 micron thick photochromic material. Whereas the art of extruding thin films has kept pace by providing the desired thin film substrates, the known coating processes are generally considered unsatisfactory for providing the desired thin, smooth, uniform coating on these substrates.

BRIEF SUMMARY OF THE INVENTION

The present invention is believed to satisfy the need for a thin film coating process by providing in a novel manner a smoothing roller stationed immediately after the point where the coating solution is applied to a moving film substrate. While the coating is still wet, the smoothing roller rotating in free air in a direction reverse to the movement of the film substrate, buffs the wet coating so as to form a thin, smooth, continuous and even layer of the coating along the length of the film substrate. These and other advantages will become apparent by reference to the following detailed description and drawings wherein:

FIG. 1 is a schematic view illustrating in perspective a film coating process in accordance with the invention;

FIG. 2 is an enlarged partial view illustrating in perspective the coating and smoothing operation of the process of FIG. 1;

FIG. 3 is a plan view further illustrating the coating and smoothing operations shown in FIG. 2; and FIG. 4 is a schematic view illustrating in perspective a second process incorporating the features of the invention.

The application of thin single-sided coatings to moving flexible substrates is widely practiced in many industries, including the manufacture of magnetic tapes, coated papers, photographic films, etc. The coating material is commonly applied from a solution, dispersion, or emulsion (hereafter collectively referred to as a solution) with a drying stage between the point of deposition of the liquid onto the moving substrate and the point at which the dry coated material is collected.

The processes illustrated by the drawings are suitable, for example, to provide a thin film substrate of .001 inch thick polyethylene terephthalate film such as Mylar film available from E. I. duPont de Nemours Company, with a photochromic or dye material for use as a recording medium in display applications such as disclosed in the commonly assigned U.S. applications of Carlson et al. entitled, "Information Processing Systems Using Lasers," S.N. 549,281, filed May 11, 1966; and of Carlson entitled, "Laser and Film Deformation Recording and Erasing System," S.N. 585,060, filed Oct. 7, 1966. With reference to FIG. 1, a flexible film substrate 10 is drawn from a supply roll 12 and is guided by a guide roll 14 into tangential contact with an application roller 16. The supply roll 12 is provided with a brake motor 11 that provides resistance to the unrolling of the substrate to thereby produce a desired tension in the film substrate. The tension is varied by adjustment of the braking motor 11 through brake motor control means 17. Said guide roll 14 is mounted on pivot arm 13 which can be pivotally adjusted by setting 15 to control the contact angle of the film substrate with the application roller 16. The application roller is rotated by drive means 18 at an independently controllable speed, by adjustment of a drive control 19, in a direction opposite to the movement of the film substrate (as shown by the arrows). The lower portion of the application roller 16 is immersed in a coating solution 20 that is typically a solution of a synthetic organic polymer in an organic solvent. A wiper blade 22 having a slidable mounting 23 to and away from the application roller 16, controls the amount of liquid carried by the application roller 16 into contact with the substrate 10.

The substrate with the wet coating of solution applied thereon by the application roller 16 passes directly to a smoothing roller 24. The smoothing roller is rotated by drive means 26 at an independently controllable speed, by adjustment of a drive control 27, in a direction opposite to the movement of the coated substrate 10. The smoothing roller 24 having a diameter of, for example, 2 inches, rotates in free air. A wiper blade 28 having slidable mounting 29 to and away from the smoothing roller 24 provides for the removal of all but a very thin coating, e.g., 1 mil, of the solution deposited thereon from contact with the coated substrate.

The coated substrate is directed away from the smoothing roller 24 and through a drying process. This drying process can take any number of forms. For example, the coated film may be directed in free air along a path of sufficient length whereby drying is achieved without auxiliary heating means. A more common heating process is exemplified in FIG. 1 wherein the coated film is directed around an idler roller 30 (contacting the non-coated side only) and through a heating unit 32 (shown in dotted lines). Said idler 30 is mounted on pivot arm 25 which can be pivotally adjusted by setting 31 to control the contact angle of the film substrate 10 with the smoothing roller 24. The coating is dried by the time it reaches the top of the heating unit so that it can be guided by guide roller 34 out of the heating unit into the nip between a pressure roller 36 (mounted on pivot arm 33 and biased by spring 35) and a capstan 37. The capstan 37 is driven by drive means 39 having a drive control 41 to control the speed at which the film substrate is drawn through the coating and smoothing operations. The coated substrate is then collected by a take-up roll 38 that is driven by a take-up roll drive means 43 at a rate compatible with the controlled speed of the capstan 37, e.g., by a slip clutch arrangement.

The efficiency of the smoothing device as described, is independent of the method by which the coating solution as has been applied to the substrate, so long as there has not been significant drying before the coated film is contacted by the smoothing roller. FIG. 4 diagrammatically illustrates how the invention can be applied to a system in which the coating is applied by a doctor blade process. In this case, the supply roll 12' is adapted to unroll the film substrate 10 with the side to be coated as the top side. In a manner well-known to the coating arts, the coating solution is directed onto the film by feed means 40 and applied in a desired thickness by by a doctor blade 42. The direction of movement of the coated film is reversed by guide roller 44 to bring the wet coating to the underside of the substrate. As in the previously described example, the coated substrate is then passed over a smoothing roller 24' (rotating opposite to the movement of the film) for smoothing the coating. By way of guide rollers 30', 34', and pressure roller 36' and capstan 37', the coated film is directed through a drying process and onto a take-up roll 38' in the same manner discribed for the embodiment of FIG. 1.

Other coating processes common to the art include gravure coating, air blade coating, spraying, etc. All of these processes can be utilized in the present invention so long as the coating has not significantly dried before contacting the smoothing roller. Such drying is avoided as described heretofore by positioning the smoothing roller close to the point where the wet coating is applied. However, the drying process can be impeded by encasing the area between the point of appliction and the smoothing roller with a casing 46 illustrated in FIG. 1. This casing can be comprised of a lower portion 48 and an upper portion 50, the upper portion being conected to the lower portion by a hinge 52 to enable the upper portion to be swung away and permit servicing at the application and smoothing stations. The atmosphere within the casing can be saturated, for example, with the solvent of the coating which will virtually stop the curing of the coating while the substrate is contained within the casing 46. With the use of such a casing, the distance by which the smoothing roller can be removed from the point of application is significantly increased.

It is to be understood that whatever method of coating is used, control of uniformity and thickness of the final dry coating is obtained by adjustment of the following smoothing unit parameters: (a) the peripheral speed of the smoothing roller by adjustment of drive control 27, (b) the contact angle between the coated substrate and the smoothing roller by adjustment of setting 31, (c) the width of the gap between the wiper blade and the smoothing roller by adjustment of the slidable mounting 29, and (d) the tension in the substrate as it makes contact with the roller by adjustment of the brake motor control means 17.

Other factors which affect dry coating thickness and uniformity include the solids content of the coating liquid, the viscosity of the coating liquid, the surface tension between the coating liquid and the substrate surface, (all of which are controlled through a variation on the formulation of the coating solution 20) and the linear speed of the substrate through the coating machine, by adjustment of the capstan drive control 41.

These variables will take on different values for the different applications of the process. However, variables of this nature are common to film-coating processes and require no more than conventional adjustments that are familiar to the coating art.

One guide that is useful to determine whether the coating is being properly applied, i.e., whether the above-mentioned variables are properly adjusted, is illustrated in FIG. 3. In this process the film substrate is transparent, e.g., .001 inch Mylar, and the coating applied thereon is opaque. Thus an operator can observe the coating through the film as shown in FIG. 3. It has been found that a proper balance of many of the variables can be ascertained by observing the line 54 that is formed as the starting edge of the coating being applied by the application roller 16. It is desired to keep this line 54 straight and thus if the line curves toward the supply roll 12 as shown in dotted line 54a, correction should be made as, for example, by increasing the linear speed of the substrate 10, and if the line curves toward the take-up roll 38 as shown by dotted line 54b, correction should be made as, for example, by slowing the linear sped of the substrate.

Similarly, the effect of the smoothing roller 24 can be observed through the transparent substrate at the point 56 where the smoothing roller contacts the wet coating. Thus, if the desired smoothing action is not being achieved this can be observed by noting irregularities in the coating and the proper adjustments can be made.

EXAMPLE 1

A coating system that was used in the apparatus illustarted in FIG. 1 successfully provided a continuous coating of 35 millimeter width polyethylene terephthalate film of 0.001 inch thickness with photochromic coatings whose thickness could be controlled uniformly in the range 0.5–10 microns. The variation of film thickness was held to within ±10% of the desired level. The coating solutions have the following compositions:

|  | Percent by weight |
| --- | --- |
| Acryloid B72 resin | 5–20 |
| N.C.R. Photochromic dye #135 | 4 |
| Sodium lauryl sulphate | ½ |
| Toluene | to 100 |

The above N.C.R. Photochromic dye #135 is a photochromic dye of the Spiropyran type available from The National Cash Register Company.

EXAMPLE 2

In a second application, a 16 millimeter film was coated with a solution of nitrocellulose and Crystal Violet in a mixture of amyl acetate and ethyl alcohol. The substrate in this case was 0.003 inch Mylar polyester film and the coating thickness was controlled by the means previously described to give a dry thickness of 1 micron ±10%. The coated film was used for heat-mode recording by means of a helium-neon laser beam.

The present invention is believed to satisfy a real existing need in the art of thin film coatings by providing the improvement whereby such thin films can be coated with a high degree of control as to coating thickness and uniformity. Such improvement is believed to be provided by the use of a smoothing roller rotating in a direction opposite to the movement of the film and which operates at a point sufficiently close to the point of application so that significant drying thereof has not resulted. As previously mentioned, the solution application may be any of the standard techniques such as gravure coating, reverse roller coating, knife coating, etc. It is believed important to the successful operation of the invention that before a significant amount of the solvent evaporates from the coating, the latter is brought into contact (tangential) with the smoothing roller that may be constructed of, for example, polished metal. The smoothing roller is wetted by the coating solution from the film (to thus provide its own lubricant) and effectively evens out the residual solution as it is contacted by the roller.

As was previously described, buildup of the coating solution on the smoothing roller is avoided by the aforementioned wiper blade which is accurately spaced to provide and adjustable narrow gap through which only a very thin film of the liquid is carried by the roller.

What is claimed is:

1. A process for coating a flexible substrate with a thin, smooth, uniform coating material that comprises applying a wet solution of the coating material onto a flexible substrate, passing the substrate with coated side down over a smoothing roller that is rotating in a direction reverse to the moving substrate whereby the coated side of the substrate makes tangential contact with the smoothing roller, the coated substrate being brought into contact with the smoothing roller before there is any significant drying of the coating solution, saturating the atmosphere surrounding the film substrate between the point where the coating is applied and the smoothing roller wherein said atmosphere surrounding the film substrate is saturated with the solvent of the coating solution, and regulating the amount of coating material permitted on the surface of said smoothing roller by adjusting the gap between the smoothing roller and a wiper blade precisely positioned adjacent thereto.

2. A process for coating a flexible substrate with a thin, smooth, uniform coating material as defined in claim 1 wherein said substrate is comprised of a thin polyester film having a thickness of about .001–.003 inch and said coating applied thereon is about .5–10 microns in thickness coated to a uniformity of ±10% when the coating is dry, said process including drying the coating on the substrate after it is passed over the smoothing roller.

3. An apparatus for coating a flexible substrate with a thin, smooth, uniform coating material comprising: means for applying a wet solution of the coating material onto a moving flexible substrate, a smoothing roller having a surface comprised of polished metal, drive means for rotatably driving the smoothing roller, guide means for guiding the flexible substrate over the smoothing roller in a direction opposite to the rotation of the roller whereby the coated side of the substrate is brought into tangential contact with the roller. a casing surrounding the flexible substrate as it is guided from the point of coating application to the smoothing roller, means for saturating the interior of the casing with the solvent of the coating material, and a wiper blade precisely positioned with respect to the smoothing roller to remove the excess beyond a desired thickness of coating material collected on the roller from its contact with the coated substrate.

4. An apparatus for coating a flexible substrate with a thin, smooth, uniform coating material as defined in claim 3 wherein said flexible substrate is comprised of a thin polyester film having a thickness of about .001–.003 inch and said coating applied thereon is about .5–10 microns in thickness coated to a uniformity of ±10% when the coating is dry, said means for applying the wet solution of the coating onto the moving substrate comprising an application roller that is partially immersed in the coating solution, means for rotating the application roller opposite to the flexible substrate movement for applying a coating of the solution onto the substrate, and said wiper blade for the smoothing roller being spaced therefrom about .001 inch, and means provided after the point of smoothing to dry the coating on the film.

5. An apparatus for coating a flexible substrate with a thin, smooth, uniform coating material as defined in claim 3 that includes a tension control means to control the tension of the substrate as it is guided over the smoothing roller, speed control means to control the rate at which the flexible substrate is guided over the smoothing roller, drive control means for the drive means to control the rotative speed of the smoothing roller, and means to control the angle between the flexible substrate and the smoothing roller, said tension control means, speed control means, drive control means and angle control means being capable of adjustment such that the starting edge of said coating material forms a substantially straight line upon said substrate passing over said application roller and upon said substrate passing over said smoothing roller.

References Cited
UNITED STATES PATENTS

| | | | |
|---|---|---|---|
| 1,955,414 | 4/1934 | Dickhaut | 118—118 X |
| 2,388,339 | 11/1945 | Paxton et al. | 117—64 |
| 2,933,417 | 4/1960 | McIntyre | 118—118 X |
| 3,257,226 | 6/1966 | Thwaites | 117—64 |

RALPH S. KENDALL, Primary Examiner

U.S. Cl. X.R.

117—64, 102, 111; 118—65, 118, 244